US008879805B2

(12) United States Patent
Wang et al.

(10) Patent No.: US 8,879,805 B2
(45) Date of Patent: Nov. 4, 2014

(54) AUTOMATED IMAGE IDENTIFICATION METHOD

(75) Inventors: Yu-Chiang Frank Wang, Taipei (TW); Chih-Fan Chen, Taipei (TW); Chia-Po Wei, Tainan (TW)

(73) Assignee: Academia Sinica, Taipei (TW)

( * ) Notice: Subject to any disclaimer, the term of this patent is extended or adjusted under 35 U.S.C. 154(b) by 176 days.

(21) Appl. No.: 13/611,004

(22) Filed: Sep. 12, 2012

(65) Prior Publication Data

US 2014/0072184 A1    Mar. 13, 2014

(51) Int. Cl.
*G06K 9/00* (2006.01)

(52) U.S. Cl.
USPC ........................................................ 382/118

(58) Field of Classification Search
None
See application file for complete search history.

(56) References Cited

U.S. PATENT DOCUMENTS

2008/0014563 A1* 1/2008 Visani et al. ................... 434/155
2012/0121142 A1* 5/2012 Nagesh ......................... 382/118

OTHER PUBLICATIONS

Ramirez, Ignacio, Pablo Sprechmann, and Guillermo Sapiro. "Classification and clustering via dictionary learning with structured incoherence and shared features." Computer Vision and Pattern Recognition (CVPR), 2010 IEEE Conference on. IEEE, 2010.*
Peng, Yigang, et al. "RASL: Robust alignment by sparse and low-rank decomposition for linearly correlated images." Pattern Analysis and Machine Intelligence, IEEE Transactions on 34.11 (2012): 2233-2246.*
Chandrasekaran, Venkat, et al. "Rank-sparsity incoherence for matrix decomposition." SIAM Journal on Optimization 21.2 (2011): 572-596.*
Kong, Shu, and Donghui Wang. "A Brief Summary of Dictionary Learning Based Approach for Classification (revised)." arXiv preprint arXiv:1205.6544 (2012).*
Chen, Chih-Fan, Chia-Po Wei, and Y-CF Wang. "Low-rank matrix recovery with structural incoherence for robust face recognition." Computer Vision and Pattern Recognition (CVPR), 2012 IEEE Conference on. IEEE, 2012.*
Wright, John, et al. "Robust face recognition via sparse representation." Pattern Analysis and Machine Intelligence, IEEE Transactions on 31.2 (2009): 210-227.*
Ma, Long, et al. "Sparse representation for face recognition based on discriminative low-rank dictionary learning." Computer Vision and Pattern Recognition (CVPR), 2012 IEEE Conference on. IEEE, 2012.*
Donato, Gianluca, et al. "Classifying facial actions." Pattern Analysis and Machine Intelligence, IEEE Transactions on 21.10 (1999): 974-989.*

(Continued)

*Primary Examiner* — Stephen R Koziol
*Assistant Examiner* — Sean Conner
(74) *Attorney, Agent, or Firm* — Bacon & Thomas, PLLC (57) ABSTRACT

The present invention discloses a method to construct template images for recognition, including the steps of: obtaining a plurality of digitized images belonging to n categories; for all categories, extracting common features for images belonging to a category; comparing common features of said category with common features of other categories other than category, to obtain discriminating features for the category; and including such features into representative features to obtain template images. A method to recognize an input image using the template images so obtained is also disclosed.

9 Claims, 6 Drawing Sheets (56) References Cited

OTHER PUBLICATIONS

Bartlett, Marian Stewart. "Independent component representations for face recognition." Face Image Analysis by Unsupervised Learning. Springer US, 2001. 39-67.*

Wang, Haoran, et al. "Supervised class-specific dictionary learning for sparse modeling in action recognition." Pattern Recognition 45.11 (2012): 3902-3911.*

Wright, John, et al. "Robust principal component analysis: Exact recovery of corrupted low-rank matrices by convex optimization." Proc. of Neural Information Processing Systems. vol. 3. 2009.*

Castrodad, Alexey, and Guillermo Sapiro. "Sparse modeling of human actions from motion imagery." International journal of computer vision 100.1 (2012): 1-15.*

* cited by examiner

AUTOMATED IMAGE IDENTIFICATION METHOD

FIELD OF THE INVENTION

The present invention relates to an automated image identification method, especially to a method that uses the computer system to automatically establish template images of human faces or the like and to identify identities of human faces or the like, using template images.

BACKGROUND OF THE INVENTION

The purpose of all scientific technologies is to serve the human being. The human being is always the focus of the scientific studies. In the computerized vision technology, the study of the human face is one popular topic. As one may see, most digital cameras, smartphones, etc. are equipped with the face detection, expression identification etc. functions. These applications, however, apply to the human face in general, not to the face of any particular person.

Face recognition is one of the most desirable biometric technologies. Face recognition addresses the identification of particular persons, not the human face in general. To identify whether an image contains human faces, common features such as two eyes and one nose would suffice. To identify whether an image contains the face of a particular person, a computer system needs to have a face image database. This system then needs to obtain the representative information of the candidates to be identified, before it can calculate and determine the identity of the input face image.

To accomplish the above goal, the designed computer system needs to extract discriminating features from face images of particular persons. As a result, the collection of useful data and the abstraction of the distinctive features are the most important tasks in the face recognition technology.

In the past, many researchers have proposed a variety of approaches to achieve these tasks. However, all these approaches are designed under the presumption that the images used for training are clean images without occlusion and disguise. In other words, these training face images may not be occluded by scarf, sunglasses or masks. Such presumption is not practical, since real-world face images collected and used in establishing the face image database are always not ideally captured. For example, the images may be corrupted by poor illumination conditions, blocked by occlusion or distorted by different view angles.

Therefore, it is necessary to provide an automated face image recognition method that automatically establishes useful face template images from images of poor quality, for used in recognition.

It is also necessary to provide an automated face image recognition method that correctly identifies human faces based on images with insufficient features.

It is also necessary to provide an automated image recognition method that automatically establishes useful template images from images of poor quality, for used in recognition.

It is also necessary to provide an automated image recognition method that correctly recognizes images with insufficient features.

It is also necessary to provide an automated image recognition system that implements these methods.

OBJECTIVES OF THE INVENTION

The objective of this invention is to provide an automated face image recognition method that automatically establishes useful face template images from images of poor quality, for recognition purposes.

Another objective of this invention is to provide an automated face image recognition method that correctly identifies human faces based on images with insufficient features.

Another objective of this invention is to provide an automated image recognition method that automatically establishes useful template images from images of poor quality, for used in recognition.

Another objective of this invention is to provide an automated image recognition method that correctly recognizes images with insufficient features.

Another objective of this invention is to provide an automated image recognition system that implements these methods.

SUMMARY OF THE INVENTION

According to the automated image recognition method and system of this invention, solutions are provided for the establishment of template images, using training images that are obtained under poor illumination conditions, are occluded, or with disguise, such that the template images contain sufficient discriminating features. The method of this invention includes the steps of: Analyzing training images using the Low-Rank Matrix Recovery technology to separate noise data from the face images, filtering out pixels that don't belong to particular identities and establishing template images using the refined training data. The template images so established are useful in the identification of the source of an image, such as a face image. The obtained images may be used in image recognition, without the need of further processing, because according to the present invention, the training images need not be clean images. In establishing the template images, training images including those taken under poor illumination conditions, or witho occlusion or disguise are useful. Information contained in these images are preserved and extracted for identification purposes. This is totally different from the conventional arts, wherein only images obtained under ideal conditions are used.

In addition, in the present invention, the structural incoherence of training images is used to improve the distinctiveness of the template images. Therefore, discriminating features that represent particular identities, such size and shape of face, silhouettes of eyes and nose, are automatically extracted. Compared to the conventional arts, in particular the Low-Rank Matrix Recovery technology, the present invention presents higher accuracy in recognition.

In one aspect, the present invention provides a novel method in the establishment of template images for recognition purposes, in particular for face recognition. The method for establishing a template image for recognition comprises the following steps:

obtaining a plurality of digitized images that belong to n categories, each image including location and gray level information of pixels of the image and category information of the image itself;

for all categories, extracting common features Ai for images belonging to a category Di ($0 < i \leq n$);

comparing common features Ai of said category Di with common features Aj of a predetermined number m of categories Dj other than category Di ($0 < j \leq m \leq n-1$), to obtain difference features $\Sigma(A_j^T A_i)$ for category Di; and including said difference features $\Sigma(A_j^T A_i)$ into said common features Ai to obtain template image Ai* for category Di.

In the present invention, the template image Ai* may be the results of the optimum solution of the discriminating features for recognition. In one preferred embodiment, the template image Ai* is obtained from the following formula in one single step:

$$\min_{A_i, E_i} \|A_i\|_* + \lambda \|E_i\|_1 + \eta \sum_{j \neq i} \|A_j^T A_i\|_F^2$$

$$\text{s.t.} \quad D_i = A_i + E_i.$$

In a preferred embodiment, the predetermined number m is n−1. In this case, the common features of all existing categories other than Di are used to calculate the difference features. In one further embodiment of this invention, the step of obtaining the template images A1* to An* for all categories is included.

In another aspect of this invention, the present invention provides an automated image recognition method using the template images so obtained for each category, to determine the similarity of an input image and the template images of all categories. The method comprises the steps of:

obtaining a digitized image to be processed, said image including location and gray level information of pixels of the image;

comparing differences between images to be processed with each template image obtained from the above-described steps, to calculate similarity of said image to be processed and each said template image; and determining relation between said image to be processed and each said template image.

The above recognition process determines the category which the image of interest belongs to and thus with the highest similarity value, or with a similarity score above a predetermined threshold. In most embodiments of this invention, the training images, i.e., the plurality of images used to establish the template images, contain the face image of a plurality of particular persons. Therefore, the training images are categorized by subjects of the faces included therein. In these embodiments, the template images established are template face images of a plurality of persons. In some other embodiments, however, the training images contain the image of an article, a location or an event.

These and other objectives and advantages of this invention may be clearly understood by those skilled in the art from the following detailed descriptions by referring to the following drawings.

DETAILED DESCRIPTION OF THE INVENTION

In the following, the automated image recognition method of this invention will be described by referring to its preferred embodiments. The present invention includes a method to automatically establish template images for recognition and an automated image recognition method using the derived template images. It shall be appreciated that, in the following description, the examples are given to demonstrate the steps and the components and structure of software and hardware applicable in the present invention, so that those skilled in the art are able to practice the invented method. The detailed description shall not be used to limit the scope of the present invention.

The present invention provides a novel method for the recognition of images, especially face images. In the present invention a method to automatically construct template images to be used in identifying sources of an image with high accuracy is provided.

Figure 1:
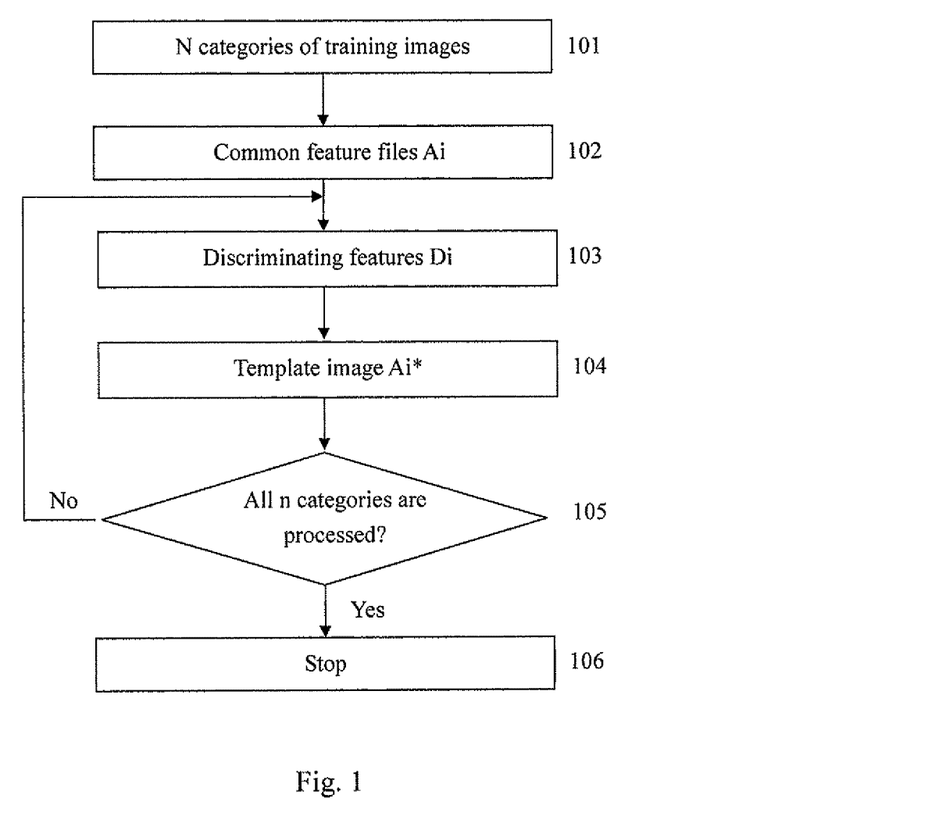
FIG. 1 is the flowchart for the method for establishing template images usable in the present invention.

FIG. 1 is the flowchart for the method for establishing template images usable in the present invention. As shown in FIG. 1, in the construction of template images, at first, at step 101*a* plurality of training images are obtained. The images are digitized images, known to belong to n (n is a natural number greater than 1) categories. In this example, the purpose is to construct template images for face recognition. Therefore, the training images obtained in this step are images containing face images of a plurality person and the n categories represent n known persons who own these faces. The training images obtained in this step are generally digitized images containing the location and gray-level value information of pixels in the image and the category information, i.e., the identity of the face images. In other words, in the case of face recognition, the training images contain information that represents the location and the gray-level values of the pixels of the image, and the identity or representative codes of particular persons. In face recognition or other applications, the training images may further contain color information of their pixels, while other information useful in image recognition may also be included in the training images.

In the application of this invention, the training images are mostly digitized images obtained by a digital image scanner or a digital camera. However, in some applications the training images may be further processed. Therefore, the training images may be compressed images or features abstracted from digitized images. In such cases, the processing may be further simplified, since data or their dimensions to be processed are reduced.

In the conventional art the so-called "Low-Rank Matrix Recovery" is one of the useful technologies, which identifies common features of images by removing sparse noises from a data matrix D to generate a low-rank matrix A that represents the input image D. The low-rank matrix A so generated maintains important features of the input image D, useful in, e.g., image recognition. The Low-Rank Matrix Recovery technology helps simplifying the processing of the input image and reduce the processing time, therefore is useful in all kinds of image recognition applications. The Low-Rank Matrix Recovery technology is also usable in the present invention, as a tool to simplify the processing of the training images and the images to be processed. For this reason, the images obtained in step 101 may be compressed images or simply features of the images compressed or abstracted by using the Low-Rank Matrix Recovery technology or any other technology. If the images obtained are raw image files, a step to compress and/or feature extract the input images may also be added. In the application of this invention, it is preferable to adjust the training images, so that they have the same or multiple resolution and size and the same orientation. Any commercially available device or software that is able to modify and adjust the training images automatically or manually may be used in this invention. Detailed description to the modification or adjustments of the training images is thus omitted.

As described above, images containing human faces would contain common or correlated features of the human face, even if the identities of those faces are different. These features include the location/position, shape and area of the eyes and the nose. For all human faces, these features are similar from face to face. Therefore, the low-rank matrices A so obtained do not contain sufficient features to distinguish one face from the others. This technical problem exists in most image recognition or mating technologies. In order to solve this technical problem, the present invention provides a method to enhance the structural incoherence of the images, so that the distinctive features of particular faces may be emphasized and the robustness of the face recognition may thus be improved.

At step 102, for all categories Di, 0<i≤n, common features of all images belonging to the same category as obtained in the previous step are extracted. In extracting the common features, pixels in different images with the same coordinate (after the resolution and the size of the images are adjusted) and similar gray-level values may be deemed common features. Other feature extraction technologies for digitized images may also be used in this invention. If the training images are low-rank matrices as described above, the common features may be extracted directly from the matrices, to obtain the common feature files Ai. In such a case, the common feature files Ai so obtained are low-rank matrices.

Figure 2:
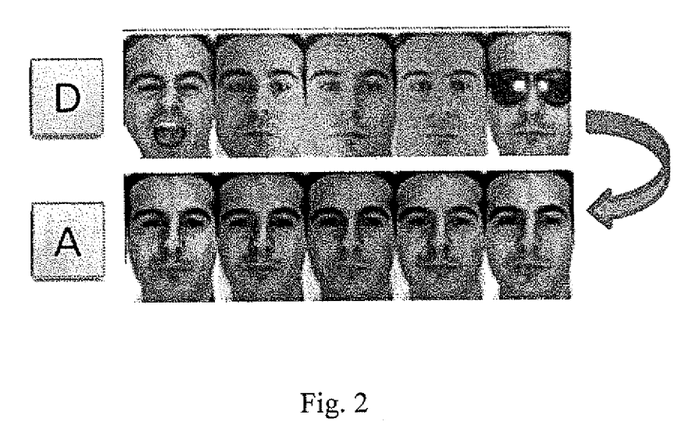
FIG. 2 illustrates the common features extracted from a plurality of face images belonging to one category.

FIG. 2 illustrates the common features extracted from a plurality of face images belonging to one same category. In this figure, the original images are shown in the upper part and the common feature images are shown in the lower part. Of course, FIG. 2 illustrates only one example of this invention and shall not be used to limit the scope of this invention.

At step 103 the common features Ai of a category Di is compared with the common features Aj of a predetermined number m, m is a natural number, of categories other than category Di, i.e., 0<j≤m≤n−1, Dj≠Di, to obtain discriminating features of category Di, $\Sigma(A_j^T A_i)$. Although in this invention, it is possible to calculate discriminating features by using the common features of only a limited number of categories, in the preferred embodiments the difference features of a category Di is obtained by comparing the common features Ai of this category with the common features of the other n−1 categories. This approach further increases the accuracy of this invention in face recognition. At step 104, calculate the optimized* by jointly solving $\Sigma(A_j^T A_i)$ and the low-rank matrix Ai of a category, and thus the template image Ai* of the category is constructed. The derived template image contains sufficient distinctive features of the category, i.e., the distinctive features of the face of a person in the case of face recognition.

In one preferred embodiment of this invention, the template image Ai* of category Di is obtained from the following formula:

$$\min_{A_i, E_i} \|A_i\|_* + \lambda \|E_i\|_1 + \eta \sum_{j \neq i} \|A_j^T A_i\|_F^2$$
$$\text{s.t.} \quad D_i = A_i + E_i.$$

wherein λ is a constant.

At step 105, determine if the template images of all the n categories are constructed. If not, the step returns to step 103; otherwise, the step stops at step 106. The derived template images provide common features of the images belonging to the same category, while those features are sufficient to distinguish images of the category from images belonging to other categories.

When using the derived template images in accordance with the present invention in image recognition, an image to be processed is compared with the template images of all the existing categories. The differences between the image to be processed and the template image of each category is recorded and quantized. The values of the difference are compared, to determine the similarity of the image to be processed and each category. In the case of face recognition, the values of difference represent the similarity of the face in the image to be processed and the template faces of the categories.

Figure 3:
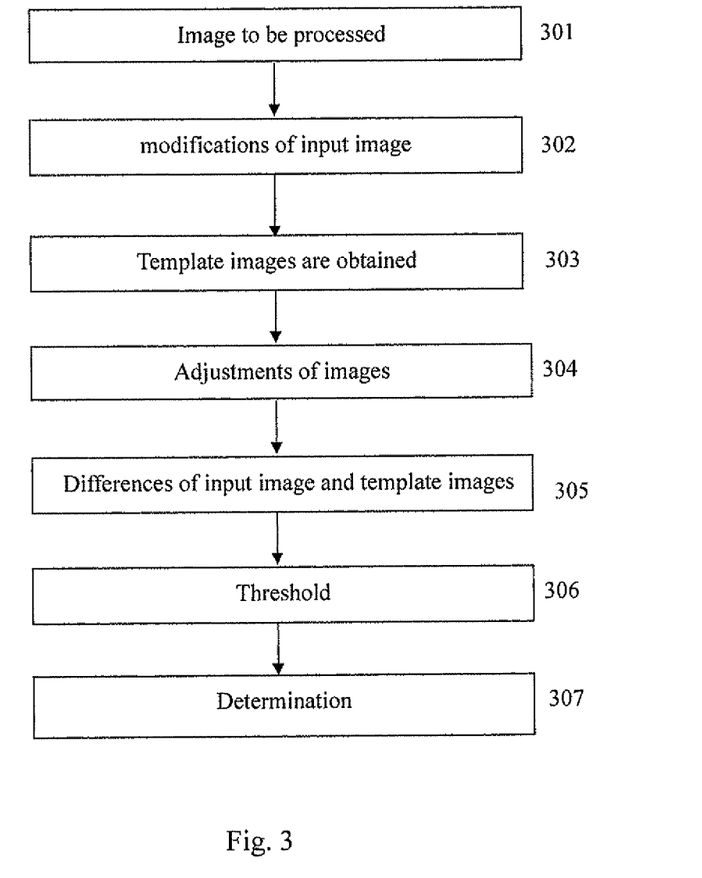
FIG. 3 is the flowchart of the automated image recognition method of this invention.
Figure 4:
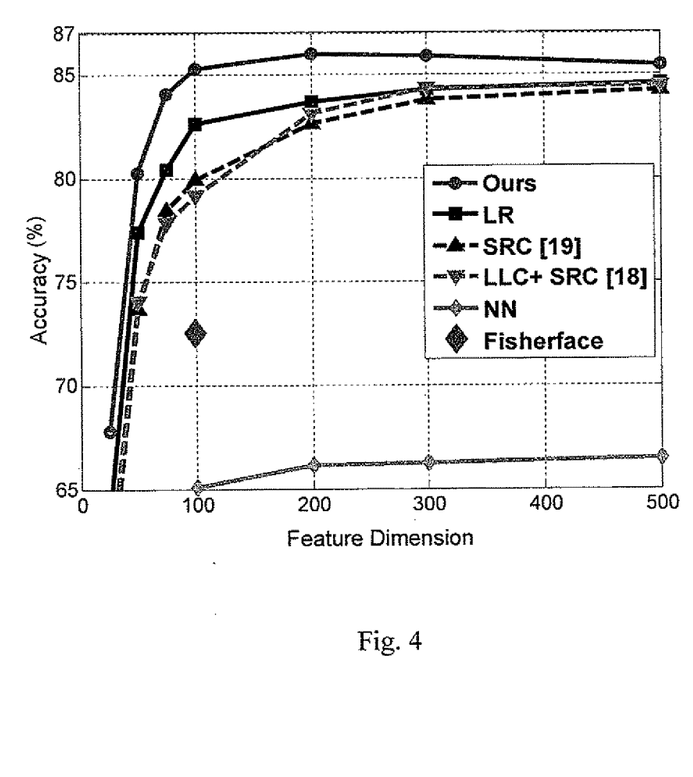
FIGS. 4-6 show the experimental results of this invention.

FIG. 3 is the flowchart of the automated image recognition method of this invention, when using the template images established according to this invention as bases. As shown in FIG. 3, at step 301 an image to be processed is obtained. The image input in this step generally contains the location and gray-level information of its pixels. At step 302 necessary modifications to the input image are conducted, such that it has desired resolution, size and orientation. If necessary, a basic point is allocated in the input image. The basic point may be used in the comparison and mating in the following steps, to improve the speed and accuracy of the image recognition. At step 303 a plurality of template images representing corresponding plurality of categories is obtained. Each template image may also include the address information and gray-level information of its pixels and its category information. If the template images are not represented by their pixels, necessary modifications to the input image or the template images may be conducted at step 304, so that they would have the same format for comparison and mating. At step 305 the input image is compared with all or a number of the template images and the differences are quantized. At step 306 difference values smaller than or equal to a threshold value are selected. At step 307 the category with the smallest difference value is selected as the result. The system determines the input image belongs to the category selected.

The combination of steps 306 and 307 avoids incorrect mating by setting a threshold. In fact, it is possible to select all the categories with difference values lower than the threshold and determine the input image belongs to all the corresponding categories. In addition, it is also possible to select the category with the smallest difference value as the result. In case of face recognition, the selected category or categories represent the owner of the face contained in the image to be processed.

In order to evaluate the accuracy of the present invention, training images are selected from the AR Database of Ohio State University, USA, at http://www2.ece.ohio-state.edu/~aleix/ARDatabase.html. The face images of 50 men and 50 women are used to generate template images using the method of this invention, with the combination shown in the following Table I. For each category, 800 training images are used to establish its template image. The remaining 1,200 images (not in the training image set) are used for evaluation, using the method of this invention.

TABLE I

| Combination | Training Images | Quantity | Images to be processed | Quantity |
|---|---|---|---|---|
| With sunglasses | 700 (Neutral) + 100 (sunglasses) | 800 | 700 (Neutral) + 200 (sunglasses) + 300 (sunglasses) | 1200 |
| With scarf | 700 (Neutral) + 100 (scarf) | 800 | 700 (Neutral) + 200 (sunglasses) + 300 (sunglasses) | 1200 |
| Sunglasses + Scarf | 700 (Neutral) + 100 (sunglasses) + 100 (scarf) | 900 | 700 (Neutral) + 200 (sunglasses) + 300 (sunglasses) + 200 (scarf) + 300 (scarf) | 1900 |

Figure 5:
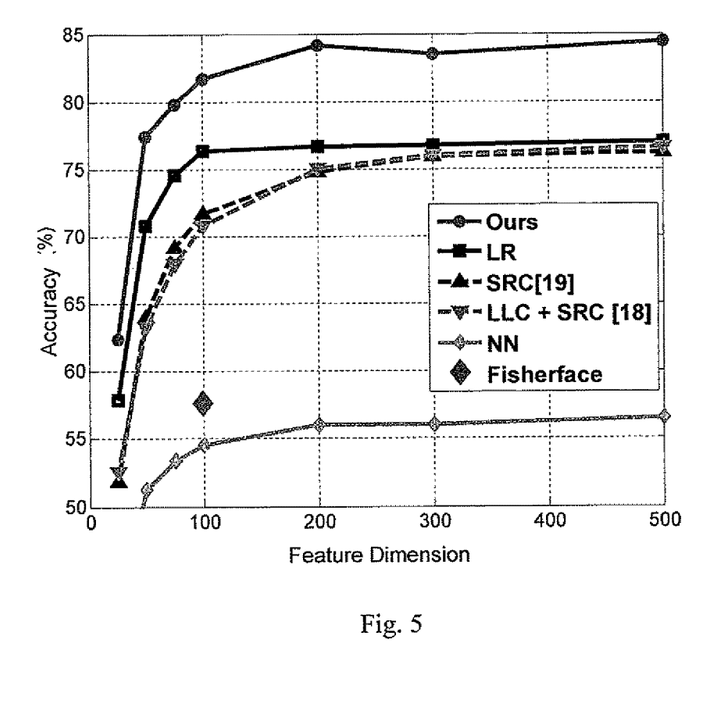
Figure 6:
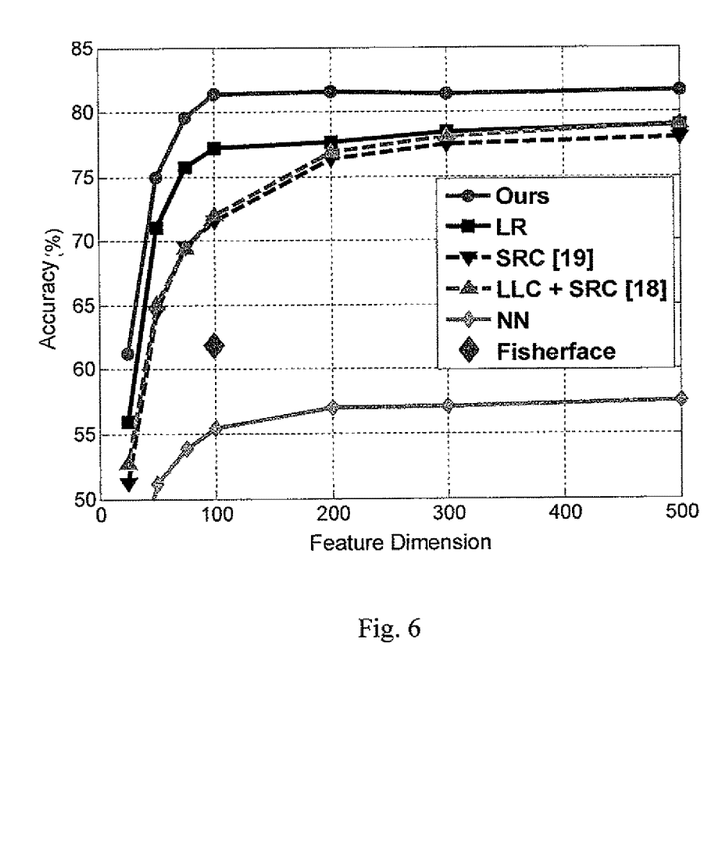

Template images established using the methods of Low-Rank Matrix Recovery (LR), Sparse Representation (SRC), Locality-Constrained Linear Coding (LLC) and Nearest Neighborhood (NN) and Fisherface are used for comparison with the present invention (Ours). The results are shown in FIGS. 5, 6 and 7. As shown, the accuracy of this invention is higher than the conventional arts. In addition, the present invention reaches high accuracy, when the feature dimension is only 75. Clearly, the present invention is able to simplify the establishment of the template images and the recognition of images, while the training speed and processing speed are both increased.

As the present invention has been shown and described with reference to preferred embodiments thereof, those skilled in the art will recognize that the above and other changes may be made therein without departing from the spirit and scope of the invention.

What is claimed is:

1. A method for constructing a template image for recognition, comprising the steps of:
   obtaining a plurality of digitized images that belong to n categories, each image including location and gray level information of pixels of the image and category information of the image;
   for all categories, abstracting common features Ai for images belonging to a category Di (0<i≤n);
   comparing common features Ai of said category Di with common features Aj of a predetermined number m of categories other than category Di (0<j≤m≤n−1), to obtain discriminating features $\Sigma(A_j^T A_i)$ for category Di; and
   including features $\Sigma(A_j^T A_i)$ into said common features Ai to obtain template image Ai* for category Di,
   wherein the template image Ai* is obtained from the following formula in one single step:

$$\min_{A_i, E_i} \|A_i\|_* + \lambda \|E_i\|_1 + \eta \sum_{j \neq i} \|A_j^T A_i\|_F^2$$

$$\text{s.t.} \quad D_i = A_i + E_i,$$

wherein η and λ are constants.

2. The method according to claim 1, wherein m is n−1.

3. The method according to claim 1, further comprising a step of obtaining template images A1* to An* for all the n categories.

4. The method according to claim 1, wherein the plurality of digitized images includes face images belonging to n persons.

5. The method according to claim 3, wherein the plurality of digitized images includes face images belonging to n persons.

6. A method for the determination of the relation between an input image and a plurality of template images, comprising the steps of:
   obtaining a digitized image to be processed, said image including location and gray level information of pixels of the image;
   comparing differences between said image to be processed with each template image obtained from claim 1, to calculate similarity of said image to be processed and each template image; and
   determining relation between said image to be processed and each template image.

7. A method for the determination of the relation between an input image and a plurality of template images, comprising the steps of:
   obtaining a digitized image to be processed, said image including address and gray level information of pixels of the image;
   comparing differences between said image to be processed with each template image obtained from claim 3, to calculate similarity of said image to be processed and each said template image; and
   determining relation between said image to be processed and each said template image.

8. A method for the determination of the relation between an input image and a plurality of template images, comprising the steps of:
   obtaining a digitized image to be processed, said image including location and gray level information of pixels of the image;
   comparing differences between said image to be processed with each template image obtained from claim 1, to calculate similarity of said image to be processed and each said template image; and
   determining said image to be processed belong to categories with difference value lower or equal to a threshold.

9. A method for the determination of the relation between an input image and a plurality of template images, comprising the steps of:
   obtaining a digitized image to be processed, said image including location and gray level information of pixels of the image;
   comparing differences between said image to be processed with each template image obtained from claim 3, to calculate similarity of said image to be processed and each said template image; and
   determining said image to be processed belong to categories with difference value lower or equal to a threshold.

* * * * *